US011338515B2

(12) United States Patent
Huang et al.

(10) Patent No.: US 11,338,515 B2
(45) Date of Patent: May 24, 2022

(54) SELF-ROTATION CLEANING DEVICE AND DEVICE FOR CLEANING PHOTO-CURED TISSUE ENGINEERING SCAFFOLD

(71) Applicant: SHANDONG UNIVERSITY, Shandong (CN)

(72) Inventors: Chuanzhen Huang, Jinan (CN); Zhen Wang, Jinan (CN); Jun Wang, Jinan (CN); Bin Zou, Jinan (CN); Hanlian Liu, Jinan (CN); Hongtao Zhu, Jinan (CN); Peng Yao, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 469 days.

(21) Appl. No.: 16/479,828

(22) PCT Filed: Oct. 17, 2018

(86) PCT No.: PCT/CN2018/110683
§ 371 (c)(1),
(2) Date: Jul. 22, 2019

(87) PCT Pub. No.: WO2020/042294
PCT Pub. Date: Mar. 5, 2020

(65) Prior Publication Data
US 2022/0105682 A1   Apr. 7, 2022

(30) Foreign Application Priority Data

Aug. 30, 2018 (CN) .......................... 201810999845.4
Aug. 30, 2018 (CN) .......................... 201821411012.3

(51) Int. Cl.
*B29C 64/35* (2017.01)
*B33Y 40/20* (2020.01)
(Continued)

(52) U.S. Cl.
CPC ................ *B29C 64/35* (2017.08); *B08B 3/08* (2013.01); *B08B 3/12* (2013.01); *B33Y 40/20* (2020.01)

(58) Field of Classification Search
CPC ...................................................... B29C 64/35
See application file for complete search history.

(56) References Cited

U.S. PATENT DOCUMENTS

2005/0233261 A1   10/2005   Slaughter

FOREIGN PATENT DOCUMENTS

CN    205009605 U    2/2016
CN    205767543 U    12/2016

OTHER PUBLICATIONS

May 5, 2019 International Search Report issued in International Patent Application No. PCT/CN2018/110683.

*Primary Examiner* — Jason Y Ko
(74) *Attorney, Agent, or Firm* — Oliff PLC

(57) ABSTRACT

A self-rotation cleaning device has outer and inner housings, a workpiece rotating system, an ultrasonic cleaning system and a fluid perfusion system. The inner housing is in the outer housing in a horizontal direction. A cylindrical cavity is inside the inner housing. One end of the inner housing has a sealing cover detachably connected thereto, and the other end is closed. The workpiece rotating system is in the cavity for fixing a member to be cleaned, and realizes self-rotation of the member. The ultrasonic cleaning system supplies mechanical energy to the cleaning liquid in the inner housing to generate bubbles therein. The bubbles remove residual resin attached to the cleaned member surface by continuous vibration and burst. The fluid perfusion system provides self-rotation power for the cleaned member, and continuously delivers the cleaning liquid to the inside of the cleaned member, and the cleaning liquid is carried out after cleaning.

18 Claims, 4 Drawing Sheets

(51) Int. Cl.
*B08B 3/08* (2006.01)
*B08B 3/12* (2006.01)

SELF-ROTATION CLEANING DEVICE AND DEVICE FOR CLEANING PHOTO-CURED TISSUE ENGINEERING SCAFFOLD

FIELD OF THE INVENTION

The present invention relates to a self-rotation cleaning device, and particularly to a self-rotation cleaning device for cleaning a tissue engineering scaffold in the field of photo-curing 3D printing technology.

BACKGROUND OF THE INVENTION

At present, some parts with complex, numerous and tiny inner holes are applied in many technical fields. These parts are difficult to clean, and there have been no special cleaning devices for such parts in the prior art. For example, in recent years, with the rapid development of various technologies such as computer-aided design, material processing and forming, 3D printing (also referred to as additive manufacturing, rapid prototyping, and free solid molding) has been applied in the fields of aerospace, automobiles, medical services, consumer goods, education and the like, and is being developed increasingly fast. Photo-curing 3D printing uses photosensitive resin (or a mixed material of photosensitive resin and ceramic) as a processing material, which material is cured with laser scanning, then driven by a CAD model and stacked in layers to finally form a three-dimensional solid model. It is generally believed that in the current 3D printing technology, the photo-curing method has the highest forming precision. Therefore, the 3D printing is increasingly used in the manufacture of various complex parts, especially in the field of tissue engineering. Many domestic and foreign scholars are engaged in research of the porous tissue engineering scaffold manufacturing technology. Tissue engineering is based on the ultimate goal of forming a biologically functional tissue or organ in vitro to repair, improve or enhance the function of a corresponding site. The growth of in vitro tissue cells requires a porous scaffold structure to act as an extracellular matrix for constructing a suitable in vitro environment and maintaining various physiological activities of the cells. Therefore, such a tissue engineering scaffold needs to have a complex and controllable inner hole structure. In this field, the advantages of the photo-curing 3D printing technology can be fully embodied.

Although the photo-curing 3D printing tissue engineering scaffold is still in the experimental research stage, it has broad development prospect and far-reaching significance for human life and health. More and more experts from the fields of biological science, material science, manufacturing science and the like are committed to this research. Using the photo-curing 3D printing technology to manufacture tissue engineering scaffolds shows good results, but the photosensitive resin is viscous and has great harm to cells. The mixed material of photosensitive resin and ceramic also needs to be cleaned thoroughly after laser curing, otherwise, the dimensional accuracy of ceramics after sintering is affected. Although there are cleaning devices for photo-cured parts at present, these devices are only effective for ordinary industrial parts. The tissue engineering scaffolds have the structural characteristic of complex, numerous and tiny inner holes, and are very different from ordinary industrial parts, so various current cleaning devices for photo-cured parts are hardly competent.

SUMMARY OF THE INVENTION

An objective of the present invention is to provide, for the problems of the current cleaning devices, particularly for the problem of effective cleaning of inner holes of a photo-cured tissue engineering scaffold, a self-rotation cleaning device, which can be used to clean inner holes of a photo-cured tissue engineering scaffold. By using a cleaning method combining pressure perfusion and ultrasonic wave, the device can clean parts with complex, numerous and tiny inner hole structures thoroughly, specifically can clean a photo-curing tissue engineering scaffold. The device not only can eliminate adverse effects of residual liquid resin on mechanical and biological properties of the tissue engineering scaffold, but also does not cause any damage to the tissue engineering scaffold during the cleaning process.

The technical solution adopted by the present invention is as follows:

A self-rotation cleaning device comprises an outer housing, an inner housing, a workpiece rotating system, an ultrasonic cleaning system and a fluid perfusion system;

the inner housing is arranged in the outer housing in a horizontal direction, a cylindrical cavity is formed inside the inner housing, one end of the inner housing is provided with a sealing cover detachably connected thereto, and the other end is closed;

the workpiece rotating system is arranged in the cavity for fixing a member to be cleaned, and realizing self-rotation of the cleaned member by using kinetic energy of fluid;

the ultrasonic cleaning system supplies mechanical energy to the cleaning liquid in the inner housing so as to generate tiny bubbles inside the liquid, and the bubbles peel off residual resin attached to the surface of the cleaned member by continuous vibration and burst;

the fluid perfusion system provides self-rotation power for the cleaned member on the one hand, and continuously delivers the cleaning liquid to the inside of the cleaned member on the other hand, and the cleaning liquid is carried out after cleaning.

Further, the front and rear ends of the inner housing are respectively provided with an inlet and an outlet connected to the fluid perfusion system by fluid, four vibrator attaching rails are respectively arranged on the upper, lower, left and right sides of the outer surface of the inner housing, the vibrator attaching rails are of planes, and the rear end surface of the inner housing is a hemispherical concave surface.

Further, the workpiece rotating system includes a cylindrical fixing basket, a disc-shaped magnet and a propeller; the cylindrical fixing basket is arranged in the inner housing, one end thereof is provided with a basket cover detachably connected thereto, and the other end is attracted to a top platform of the propeller through the disc-shaped magnet; a rotating shaft of the propeller is mounted at an end of the inner housing, and the fluid perfusion system can drive the propeller to rotate.

Further, the cylindrical fixing basket is made of stainless steel, and the area of each mesh of the cylindrical fixing basket should be 50-500 mm$^2$.

Further, the bottom surface diameter of the disc-shaped magnet is 25-40% of that of the cylindrical fixing basket. If the bottom surface diameter of the disc-shaped magnet is too small, the attraction is insecure, and if the bottom surface diameter is too large, the fluid flow is hindered.

Further, the blade diameter of the propeller should be 40-85% of the bottom surface diameter of the cylindrical fixing basket, a protruding top platform is formed in the middle of the propeller, and the diameter of the top platform is 80-100% of the bottom surface diameter of the disc-shaped magnet; and the top end of the rotating shaft of the propeller is a protruding hemisphere, which is rotatably connected with the hemispherical concave surface at the rear end of the inner cavity.

Further, the ultrasonic cleaning system includes a handle, four vibrators, an ultrasonic generator, four springs, an inner fixing ring, an outer fixing ring, three sliders, two connecting rods, four levers, and four fulcrums.

The ultrasonic generator is mounted on the outer side surface of the outer housing; the inner fixing ring and the outer fixing ring are mounted coaxial with the inner shell and sequentially arranged on an outer ring of the inner housing, the four levers distributed annularly are arranged between the inner fixing ring and the outer fixing ring, the four levers are respectively in contact with the four fulcrums, and the four levers are connected into a circle by the two connecting rods; head portions of the four vibrators are attached to the four vibrator attaching rails on the outer surface of the inner housing, a handle portion of each of the four vibrators penetrates through a spring, the springs are located between the head portions of the vibrators and the inner fixing ring, the ends of the handle portions of two of the vibrators are connected to the levers, and the ends of the handle portions of the other two vibrators are connected to the connecting rods; the handle penetrates through the outer housing and the outer fixing ring and is connected with one of the connecting rods; and the three sliders are arranged outside the outer fixing ring, and can slide along the slide rails arranged on the inner side surface of the outer housing.

Further, the inner fixing ring is provided with four small holes, and the diameter of the holes is between the diameters of the head and handle portions of the four vibrators.

Further, three slide rails are arranged on the top and left and right sides of the outer housing, and the outer housing is further provided with a liquid injection port.

Further, the fluid perfusion system includes a pump, a governor and a reservoir tank; the pump is connected to the governor by a wire, the pump is fixed to the bottom of the outer housing, and an outlet of the pump is connected to a liquid inlet at the front end of the inner cavity by a pipe; the top of the reservoir tank is provided with a liquid injection port, a filter screen is arranged in the middle of the reservoir tank, the tank wall above the filter screen is provided with an inlet, and the tank wall below the filter screen is provided with an outlet; the inlet of the reservoir tank is connected to a liquid outlet at the rear end of the inner housing by a pipe, the outlet of the reservoir tank is connected to an inlet of the pump by a pipe, and the liquid injection port of the reservoir tank is connected to the liquid injection port of the outer housing by a pipe.

Further, the cleaning liquid is anhydrous ethanol.

A device for cleaning a photo-cured tissue engineering scaffold uses the aforementioned self-rotation cleaning device.

The working principle of the present invention is as follows:

The present invention is a special cleaning device designed for some cleaned members with structure characteristics of complex, numerous and tiny inner pores; a cleaned member is placed in the fixing basket, and then the fixing basket is attracted to the top platform of the propeller through the disc-shaped magnet. The vibrators in the ultrasonic cleaning system convert electrical energy into mechanical energy according to certain ultrasonic frequency and transfer the mechanical energy to the cleaning liquid in the inner cavity so as to generate tiny bubbles inside the liquid, and the bubbles peel off residual dirt attached to the surface of the cleaned member by means of continuous vibration and burst. The ultrasonic cleaning system also realizes free adjustment of the vibrators in the axis direction of the inner cavity through a set of connecting rods and levers. When the ultrasonic cleaning system is working, the fluid perfusion system drives the propeller to rotate on the one hand such that the cleaned member placed in the fixing basket continuously rotates, and continuously delivers the cleaning liquid to the inside of the cleaned member on the other hand, and the dirt is dissolved in the cleaning liquid and then carried out along with the cleaning liquid.

Beneficial technical effects of the present invention are as follows:

1. Cleaning and self-rotation of the cleaned member are simultaneously realized using a cleaning method combining fluid perfusion and ultrasonic wave and a workpiece rotating system, and free adjustment of the vibrators in the axis direction of the inner cavity is realized using a set of connecting rods and levers.

2. Not only can the surface of a photo-curable part be cleaned, but also the tiny inner hole structure of the tissue engineering scaffold formed by photo-curing can be thoroughly cleaned. The fluid perfusion pressure and the ultrasonic frequency are adjusted to adapt to tissue engineering scaffolds having different inner hole sizes and different structural strengths, the tissue engineering scaffold is not damaged during the cleaning process, and the anhydrous ethanol as a detergent does not contaminate the tissue engineering scaffold or cause adverse effects on the biological properties thereof. The entire cleaning device is compact in structure, small in size, convenient to carry, and easy to operate.

3. The device can also be applied to the cleaning of parts in other fields.

BRIEF DESCRIPTION OF THE DRAWINGS

The accompanying drawings constituting a part of the present application are used for providing a further understanding of the present application, and the illustrative embodiments of the present application and the illustration thereof are used for interpreting the present application, rather than constituting improper limitations to the present application.

Figure 1:
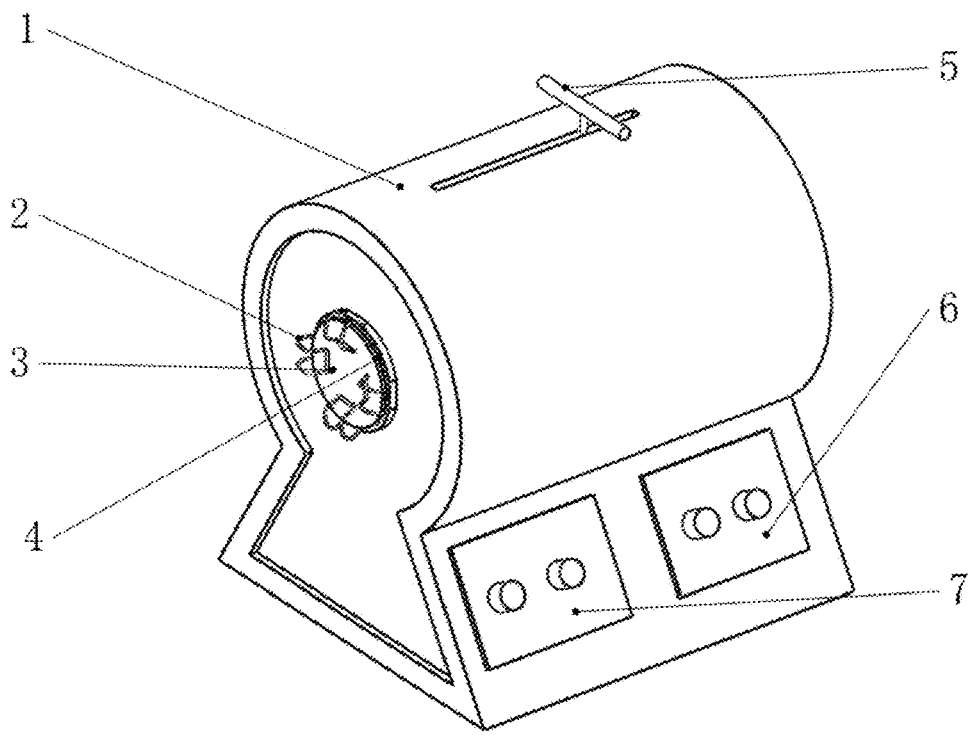
FIG. 1 is a schematic diagram of a profile according to the present invention.

In which: 1, outer housing; 2, sealing cover buckle; 3, sealing cover; 4, sealing washer; 5, handle; 6, ultrasonic generator; 7, governor; 8-1, slider; 8-2, slider; 8-3, slider; 9-1, slide rail; 9-2, slide rail; 9-3, slide rail; 10, fixing basket; 11, inner cavity; 12-1, liquid inlet; 12-2, liquid outlet; 12-3, reservoir tank inlet; 12-4, reservoir tank outlet; 12-5, pump inlet; 12-6, pump outlet; 12-7, liquid injection port; 12-8, reservoir tank injection port; 13, pump; 14-1, spring; 14-2, spring; 14-3, spring; 14-4, spring; 15-1, vibrator; 15-2, vibrator; 15-3, vibrator; 15-4, vibrator; 16, propeller; 17, disc-shaped magnet; 18, filter screen; 19, reservoir tank; 20-1, connecting rod; 20-2, connecting rod; 21-1, lever;

21-2, lever; 21-3, lever; 21-4, lever; 22-1, fulcrum; 22-2, fulcrum; 22-3, fulcrum; 22-4, fulcrum; 23, internal fixing ring; 24, external fixing ring. 25-1, vibrator attaching rail; 25-2, vibrator attaching rail; 25-3, vibrator attaching rail; 25-4, vibrator attaching rail; 26, basket cover; 27, basket cover buckle; 28, top platform; 29, rotating shaft; 30, hemisphere; 31, inner housing.

DETAILED DESCRIPTION OF THE EMBODIMENTS

It should be pointed out that the following detailed descriptions are all exemplary and intend to further illustrate the present application. Unless otherwise specified, all technological and scientific terms used in the descriptions have the same meanings generally understood by those of ordinary skill in the art of the present application.

It should be noted that the terms used herein are merely for describing specific embodiments, but are not intended to limit exemplary embodiments according to the present application. As used herein, unless otherwise explicitly stated in the context, the singular form is also intended to include the plural form. In addition, it should also be appreciated that when the terms "include" and/or "comprise" are used in the description, they indicate features, steps, operations, devices, components and/or their combination.

For ease of description, if the terms "upper", "lower", "left" and "right" appear in the present invention, the terms only indicate they are in consistent with the upper, lower, left and right directions of the drawings, do not limit the structure, are only for facilitating the description of the present invention and simplifying the description, do not indicate or imply that the referred devices or elements must have specific directions or be constructed and operated in specific orientations, so the terms should not be construed as limitations to the present invention.

In the interpretation of the terms, the terms "installed", "connected", "fixed" and the like in the present invention should be generally understood, for example, the "connected" may be fixedly connected, detachably connected, integrally connected, mechanically connected, electrically connected, directly connected, indirectly connected by an intermediate medium, internally connected for two components or an interactive relation between two components, and the specific meanings of the terms in the present invention may be understood by those of ordinary skill in the art according to specific circumstances.

The "vibrator attaching rail" described in the present invention refers to a rail for attaching a vibrator.

Embodiment 1

As described in the background, there are deficiencies in the prior art. In order to solve the above technical problems, the present application proposes a self-rotation cleaning device. Taking the cleaning of a photo-cured tissue engineering scaffold as an example, the specific structure of the self-rotation cleaning device is described below. The diagram of the whole profile is as shown in FIG. 1. The self-rotation cleaning device consists of an outer housing 1, an inner housing 31, a workpiece rotating system, an ultrasonic cleaning system and a fluid perfusion system.

Further, the inner housing 31 is arranged in the outer housing 1 in a horizontal direction, the inner housing forms a cylindrical inner cavity 11, one end of the inner housing 31 matches a sealing cover 3, a sealing washer 4 is arranged between the inner housing 31 and the sealing cover 3, and the inner housing 31 is detachably connected with the sealing cover 3 by sealing cover buckles 2; the other end of the inner housing 31 is sealed, which may be achieved by integral molding with the inner housing or by an end cover; the front and rear ends of the inner housing 31 are respectively provided with a liquid inlet 12-1 and a liquid outlet 12-2, the rear end of the inner housing 31 is further provided with a hemispherical concave surface, the inner surface of the inner housing 31 is cylindrical, four vibrator attaching rails 25-1, 25-2, 25-3 and 25-4 are respectively arranged on the upper, lower, left and right sides of the outer surface of the inner housing 31, and the vibrator attaching rails are of planes. The outer housing 1, the inner housing 31 and the sealing cover 3 are all made of stainless steel.

Further, the end of the inner housing 31 matching the sealing cover 3 and the outer wall of the outer housing 1 are substantially in a plane to facilitate placing and taking off the tissue engineering scaffold, and the other end of the inner housing is in the outer housing 1.

Further, three slide rails 9-1, 9-2 and 9-3 are arranged on the top and left and right sides of the outer housing 1, and the back of the outer housing 1 is further provided with a liquid injection port 12-7.

Figure 2:
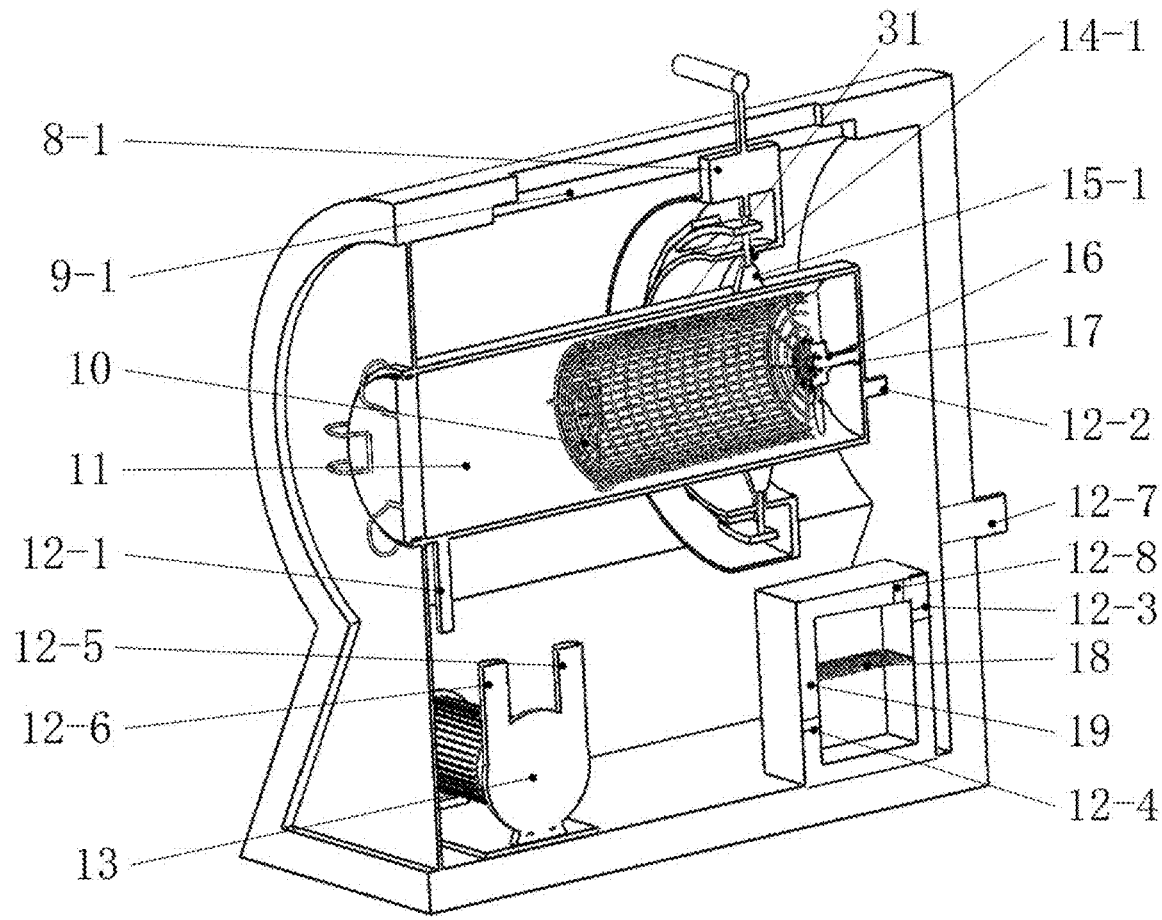
FIG. 2 is a schematic diagram of an internal structure according to the present invention.
Figure 3:
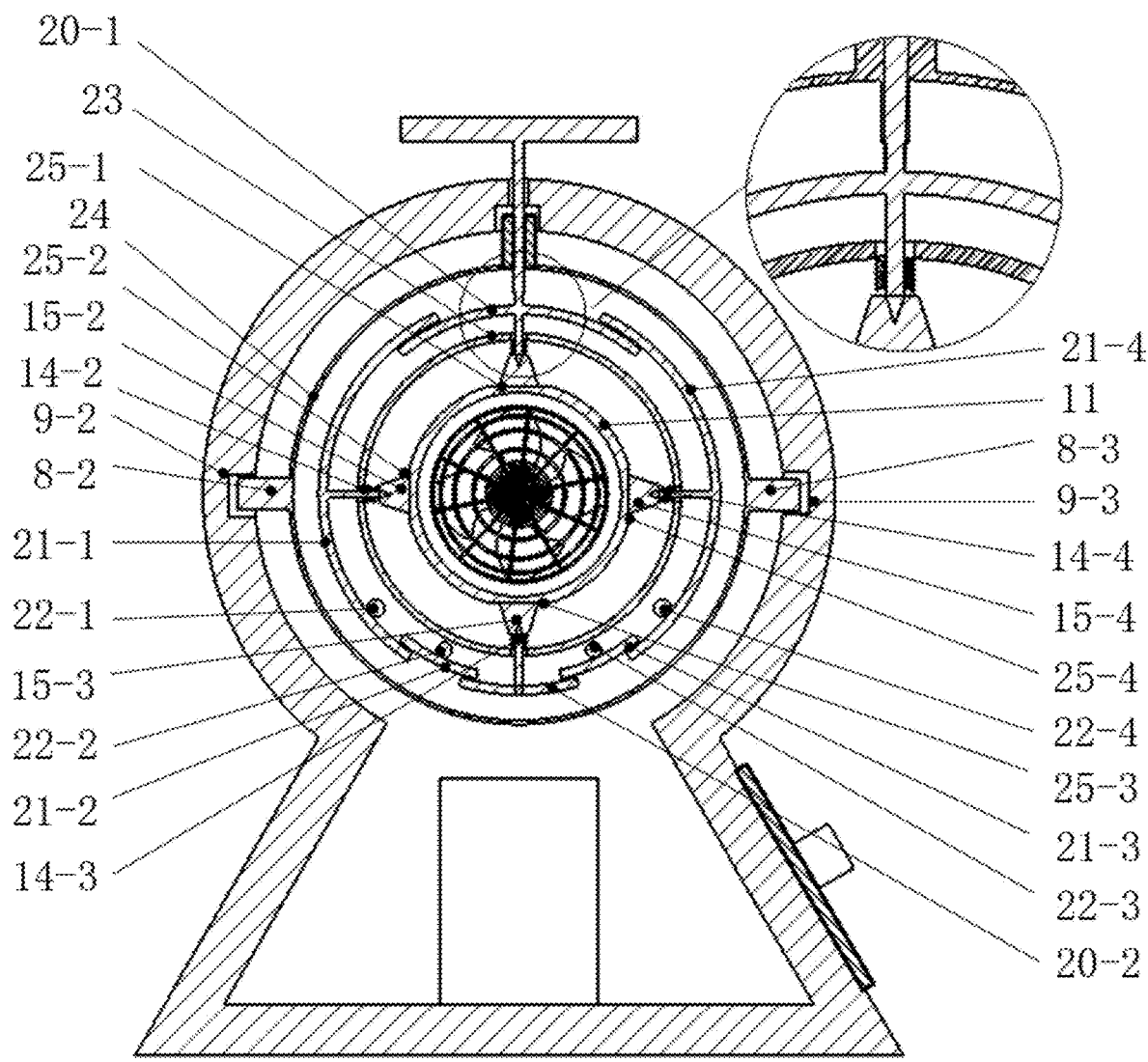
FIG. 3 is a structure diagram of an ultrasonic cleaning system according to the present invention.
Figure 4:
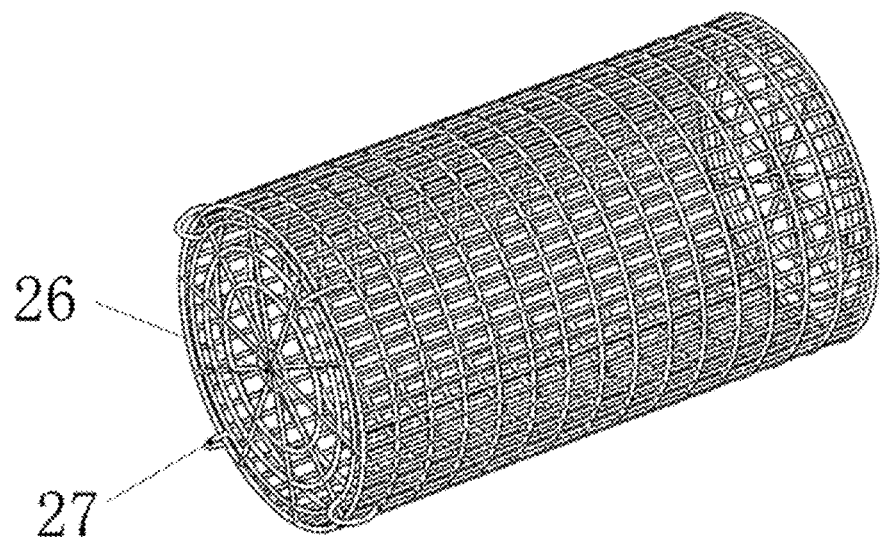
FIG. 4 is a structure diagram of a fixing basket according to the present invention.

As shown in FIG. 2 and FIG. 3, the workpiece rotating system includes a cylindrical fixing basket 10, a disc-shaped magnet 17 and a propeller 16. Preferably, the cylindrical fixing basket 10 is made of stainless steel, the area of each mesh of the cylindrical fixing basket 10 should be 80-150 mm$^2$, a basket cover 26 is arranged at one end of the cylindrical fixing basket 10, and the cylindrical fixing basket 10 is detachably connected with the basket cover 26 by basket cover buckles 27.

One bottom surface of the disc-shaped magnet 17 is attracted to the bottom of the cylindrical fixing basket 10, and the other bottom surface is attracted to a top platform 28 of the propeller 16.

Figure 5:
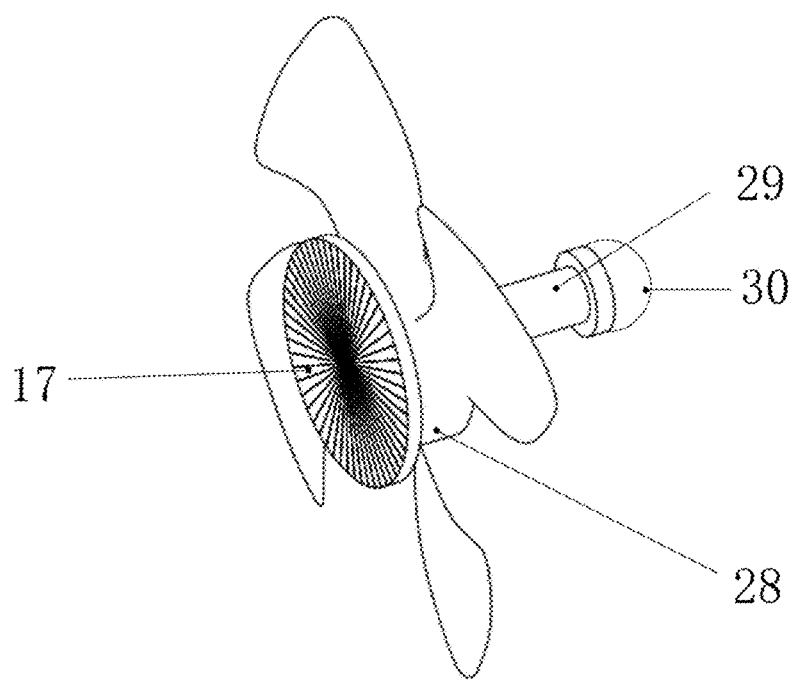
FIG. 5 is a structure diagram of a propeller according to the present invention.
Figure 6:
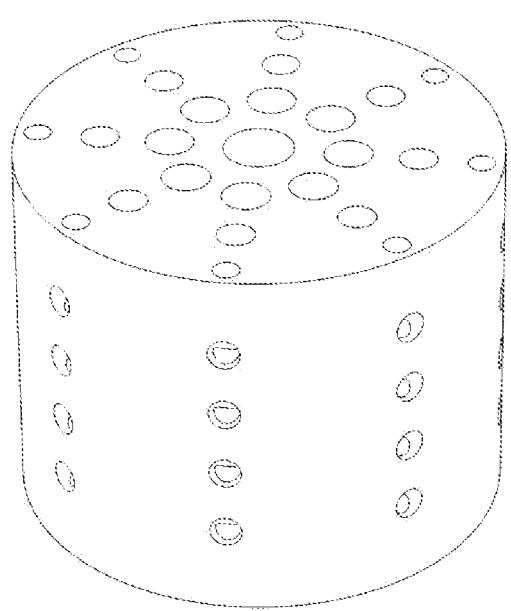
FIG. 6 is a photo-cured tissue engineering scaffold cleaned using the present invention.

FIG. 5 shows a structure of the propeller 16 in the present invention, the top end of a rotating shaft 29 of the propeller 16 is a protruding hemisphere 30, which is rotatably connected to the hemispherical concave surface at the bottom of the inner cavity 11.

Further, the ultrasonic cleaning system includes a handle 5, four vibrators 15-1, 15-2, 15-3 and 15-4, an ultrasonic generator 6, four springs 14-1, 14-2, 14-3 and 14-4, an inner fixing ring 23, an outer fixing ring 24, three sliders 8-1, 8-2 and 8-3, two connecting rods 20-1 and 20-2, four levers 21-1, 21-2, 21-3 and 21-4, and four fulcrums 22-1, 22-2, 22-3 and 22-4. The ultrasonic generator 6 is mounted on the outer side surface of the outer housing 1. The four vibrators 15 are respectively on the four vibrator attaching rails 25 on the outer surface of the inner housing 31. The inner fixing ring 23 surrounds the four vibrators 15, the inner fixing ring 23 is provided with four small holes, and the diameter of the holes is between the diameters of head and handle portions of the four vibrators. The handle portions of the four vibrators 15 penetrate through the four springs 14, such that the springs 14 are located between the heads of the vibrators 15 and the inner fixing ring 23. The two connecting rods 20 and the four levers 21 surround the inner fixing ring 23, and the four levers 21 are in contact with the four fulcrums 22 respectively. The outer fixing ring 24 surrounds the two connecting rods 20 and the four levers 21, the sliders 8 are arranged on the top and left and right sides of the outer fixing ring 24, and the three sliders 8 are in sliding connection with the three slide rails 9 of the outer housing 1.

The lever 21-1 and the lever 21-4 have completely the same structure and are symmetrically arranged; the lever 21-2 and the lever 21-3 have completely the same structure and are symmetrically arranged; the lever 21-1, the lever 21-2, the connecting rod 20-2, the lever 21-3, the lever 21-4 and the connecting rod 20-1 are sequentially connected end to end to form a circle. The handle end of the vibrator 15-2 is fixed to the lever 21-1; the handle end of the vibrator 15-3 is fixed to the connecting rod 20-2; the handle end of the vibrator 15-4 is fixed to the lever 21-4; and the handle end of the vibrator 15-1 is fixed to the connecting rod 20-1.

Further, the inner fixing ring 23, the four fulcrums 22 and the outer fixing ring 24 are rigidly connected. The handle 5, the connecting rod 20-1 and the vibrator 15-1 are rigidly connected.

Further, the four vibrators, the four springs, the inner fixing ring 23, the outer fixing ring 24, the three sliders, the two connecting rods, the four levers and the four fulcrums are all distributed bilaterally symmetrically and annularly. According to the left structure, the transmission principle of the above ultrasonic cleaning system is further described: when the handle 5 is lifted up, the spring 14-1 is compressed, the vibrator 15-1 leaves the vibrator attaching rail 25-1, at the same time, the connecting rod 20-1 moves outward, the connecting rod 20-1 moves the lever 21-1 to rotate around the fulcrum 22-1, the upper end of the lever 21-1 rotates outward to drive the vibrator 15-2 to leave the vibrator attaching rail 25-2, the lower end of the lever 21-1 rotates inward to drive the lever 21-2 to rotate around the fulcrum 22-2, the lower end of the lever 21-2 rotates outward to drive the connecting rod 20-2 to move downward, and then the vibrator 15-3 is driven to leave the vibrator attaching rail 25-3. Then, the handle 5 is moved back and forth by an external force, so that the four vibrators can move along the axis of the inner cavity 11.

Further, the fluid perfusion system includes a pump 13, a governor 7 and a reservoir tank 19. The pump 13 is connected to the governor 7 by a wire, the pump 13 is fixed to the bottom of the outer housing 1, and a pump outlet 12-6 is connected to a liquid inlet 12-1 at the front end of the inner cavity 11 by a pipe. The top of the reservoir tank 19 is provided with a reservoir tank injection port 12-8, a filter screen 18 is arranged in the middle of the reservoir tank 19, the tank wall above the filter screen 18 is provided with a reservoir tank inlet 12-3, and the tank wall below the filter screen is provided with a reservoir tank outlet 12-4. The reservoir tank inlet 12-3 is connected to a liquid outlet 12-2 at the rear end of the inner cavity 11 by a pipe, the reservoir tank outlet 12-4 is connected to a pump inlet 12-5 by a pipe, and the reservoir tank injection port 12-8 is connected to the liquid injection port 12-7 of the housing by a pipe.

Further, the fluid perfusion system uses anhydrous ethanol as a cleaning liquid. The pump 13 is a special alcohol diaphragm pump. The connecting pipes are PVC pipes. Because resin is prone to being bonded and accumulated in the PVC pipes, the PVC pipes must be frequently replaced.

Specifically, some specific design dimensions are taken as an example for further description:

For example, the inner cavity 11 of the inner housing 31 has a diameter of 5 cm and an axial length of 8 cm, the inner housing is made of stainless steel 3 mm thick, the four vibrator attaching rails 25 on the outer contour of the inner housing 31 are formed by grinding or milling, and the vibrator attaching rails 25 are of 1 cm×8 cm planes.

The cylindrical fixing basket 10 has a bottom surface diameter of 3.5 cm and an axial length of 5 cm. The disc-shaped magnet 17 has a bottom surface diameter of 1 cm. If the bottom surface diameter of the disc-shaped magnet 17 is too small, the attraction is insecure, and if the bottom surface diameter is too large, the fluid flow is hindered. The blade diameter of the propeller 16 is 3 cm, a protruding top platform 28 is formed in the middle of the propeller 16, and the diameter of the top platform 28 is 1 cm.

The specific working process of the present invention is as follows:

Step 1: a photo-cured tissue engineering scaffold is placed in the cylindrical fixing basket 10, then the entire fixing basket 10 is attracted to the top platform 28 of the propeller 16 by the disc-shaped magnet 17, and the hemisphere 30 at the top end of the rotating shaft 29 of the propeller 16 is rotatably connected with the hemispherical concave surface at the bottom of the inner cavity 11; the sealing cover 3 is closed, and an appropriate amount of anhydrous ethanol is added to the liquid injection port 12-7;

Step 2: the frequency of the ultrasonic generator 6 is adjusted to 40 kHz, the flow rate of the governor 7 is adjusted to 500 ml/min, and after stable operation for 3-5 minutes, the ultrasonic generator 6 and the governor 7 are turned off; the handle is strongly lifted up and moved 2-3 cm forward or backward, and then released; the ultrasonic generator 6 and the governor 7 operate stably again at the above frequency and flow rate for 3-5 minutes;

Step 3: after the anhydrous ethanol is replaced, the frequency of the ultrasonic generator 6 is adjusted to 30 kHz, the flow rate of the governor 7 is adjusted to 1000 ml/min, and after stable operation for 3-5 minutes, the ultrasonic generator 6 and the governor 7 are turned off; the handle is strongly lifted up and moved 2-3 cm forward or backward, and then released; the ultrasonic generator 6 and the governor 7 operate stably again at the above frequency and flow rate for 3-5 minutes;

Step 4: the sealing cover buckles 2 are opened, the sealing cover 3 is opened to take out the fixing basket 10, and after 10-20 minutes at room temperature, the anhydrous ethanol on the surface and inside of the tissue engineering scaffold is completely volatilized.

According to the steps, the tissue engineering scaffold formed by photo-curing is cleaned thoroughly, no resin is left on inner holes, the cleaning strength is moderate and no damage is caused.

Embodiment 2

The self-rotation cleaning device proposed by the present application may be used for cleaning an alumina microporous ceramic part. The alumina microporous ceramic part is mainly used for sewage treatment, heat insulation, sound insulation and the like. Because of its complex, numerous and tiny inner hole structure, a good cleaning effect is difficult to achieve through common cleaning methods. For these features, the device is designed as follows:

The device comprises an outer housing, an inner housing, a workpiece rotating system, an ultrasonic cleaning system and a fluid perfusion system.

The outer housing, the inner housing, the workpiece rotating system, the ultrasonic cleaning system and the fluid perfusion system are substantially the same as those in Embodiment 1. The alumina microporous ceramic part has higher mechanical strength than the photo-cured tissue engineering scaffold in Embodiment 1, so the cleaning strength can be appropriately increased, and part of the structure in Embodiment 1 is adjusted.

In the workpiece rotating system, the area of each mesh of the cylindrical fixing basket should be 180-300 $mm^2$, a basket cover is arranged at one end of the cylindrical fixing basket, and the cylindrical fixing basket is detachably connected with the basket cover;

In the fluid perfusion system, the connecting pipes are stainless steel hoses;

The inner cavity 11 of the inner housing has a diameter of 10 cm and an axial length of 15 cm, the inner housing is made of stainless steel 3 mm thick, the four vibrator attaching rails on the inner housing are formed by grinding or milling, and the vibrator attaching rails are of 1.5 cm×15 cm planes;

The fixing basket has a bottom surface diameter of 7.5 cm and an axial length of 12 cm. The disc-shaped magnet has a bottom surface diameter of 3 cm. The blade diameter of the propeller is 6 cm, a protruding top platform is formed in the middle of the propeller, and the diameter of the top platform is 3 cm.

The process of cleaning the alumina microporous ceramic part using the present invention is as follows:

Step 1: the alumina microporous ceramic part is placed in the fixing basket, then the entire fixing basket is attracted to the top platform of the propeller by the disc-shaped magnet, and the hemisphere at the top end of the rotating shaft of the propeller is rotatably connected with the hemispherical concave surface at the bottom of the inner cavity of the inner housing; the sealing cover is closed, and an appropriate amount of anhydrous ethanol is added to the liquid injection port;

Step 2: the frequency of the ultrasonic generator is adjusted to 30 kHz, the flow rate of the governor is adjusted to 1500 ml/min, and after stable operation for 7-10 minutes, the ultrasonic generator and the governor are turned off; the handle is strongly lifted up and moved 4-6 cm forward or backward, and then released; the ultrasonic generator and the governor operate stably again at the above frequency and flow rate for 7-10 minutes;

Step 3: after the anhydrous ethanol is replaced, the frequency of the ultrasonic generator is adjusted to 20 kHz, the flow rate of the governor is adjusted to 2500 ml/min, and after stable operation for 10-15 minutes, the ultrasonic generator and the governor are turned off; the handle is strongly lifted up and moved 4-6 cm forward or backward, and then released; the ultrasonic generator and the governor operate stably again at the above frequency and flow rate for 10-15 minutes;

Step 4: the sealing cover buckles are opened, the sealing cover is opened to take off the fixing basket, and after 10-20 minutes at room temperature, the anhydrous ethanol on the surface and inside of the alumina microporous ceramic part is completely volatilized.

The cleaning device can be used to effectively clean the alumina microporous ceramic part, has a good cleaning effect particularly on soluble dirt in the tiny through holes, but has relatively poor cleaning effect on blind holes.

The above description is merely preferred embodiments of the present application, and the present application is not limited thereto. Various modifications and variations may be made to the present application for those skilled in the art. Any modification, equivalent substitution, improvement or the like made within the spirit and principle of the present application shall fall into the protection scope of the present application.

The invention claimed is:

1. A self-rotation cleaning device, comprising an outer housing, an inner housing, a workpiece rotating system, an ultrasonic cleaning system and a fluid perfusion system, wherein the inner housing is arranged in the outer housing in a horizontal direction, a cylindrical cavity is formed inside the inner housing, one end of the inner housing is provided with a sealing cover detachably connected thereto, and an other end is closed;

the workpiece rotating system is arranged in the cavity for fixing a member to be cleaned, and realizing self-rotation of the cleaned member by using kinetic energy of fluid;

the ultrasonic cleaning system supplies mechanical energy to the cleaning liquid in the inner housing so as to generate tiny bubbles inside the liquid, and the bubbles peel off residual resin attached to the surface of the cleaned member by means of continuous vibration and burst;

the fluid perfusion system provides self-rotation power for the cleaned member on the one hand, and continuously delivers the cleaning liquid to the inside of the cleaned member on the other hand, and the cleaning liquid is carried out after cleaning.

2. The self-rotation cleaning device according to claim 1, wherein the front and rear ends of the inner housing are respectively provided with an inlet and an outlet connected to the fluid perfusion system by fluid, four vibrator attaching rails are respectively arranged on the upper, lower, left and right sides of the outer surface of the inner housing, the vibrator attaching rails are of planes, and the rear end surface of the inner housing is a hemispherical concave surface.

3. The self-rotation cleaning device according to claim 1, wherein the workpiece rotating system comprises a cylindrical fixing basket, a disc-shaped magnet and a propeller; the cylindrical fixing basket is arranged in the inner housing, one end thereof is provided with a basket cover detachably connected thereto, and an other end is attracted to a top platform of the propeller through the disc-shaped magnet; a rotating shaft of the propeller is mounted at an end of the inner housing, and the fluid perfusion system can drive the propeller to rotate.

4. The self-rotation cleaning device according to claim 1, wherein the bottom surface diameter of the disc-shaped magnet is 25-40% of that of the cylindrical fixing basket.

5. The self-rotation cleaning device according to claim 1, wherein the blade diameter of the propeller is 40-85% of the bottom surface diameter of the cylindrical fixing basket, a protruding top platform is formed in the middle of the propeller, and the diameter of the top platform is 80-100% of the bottom surface diameter of the disc-shaped magnet; and the top end of the rotating shaft of the propeller is a protruding hemisphere, which is rotatably connected with the hemispherical concave surface at the rear end of the inner cavity.

6. The self-rotation cleaning device according to claim 1, wherein the ultrasonic cleaning system comprises a handle, four vibrators, an ultrasonic generator, four springs, an inner fixing ring, an outer fixing ring, three sliders, two connecting rods, four levers, and four fulcrums;

the ultrasonic generator is mounted on the outer side surface of the outer housing; the inner fixing ring and the outer fixing ring are mounted coaxial with the inner housing and sequentially arranged on an outer ring of the inner housing, the four levers distributed annularly are arranged between the inner fixing ring and the outer fixing ring, the four levers are respectively in contact with the four fulcrums, and the four levers are connected into a circle by the two connecting rods; head portions of the four vibrators are attached to the four vibrator attaching rails on the outer surface of the inner housing, a handle portion of each of the four vibrators penetrates through a spring, the springs are located between the head portions of the vibrators and the inner fixing ring, the ends of the handle portions of two of the vibrators are connected to the levers, and the ends of the handle portions of the other two vibrators are connected to the connecting rods; the handle penetrates through the outer housing and the outer fixing ring and is connected with one of the connecting rods; and the three sliders are arranged outside the outer fixing ring, and can slide along the slide rails arranged on the inner side surface of the outer housing.

7. The self-rotation cleaning device according to claim 6, wherein the inner fixing ring is provided with four small holes, and the diameter of the holes is between the diameters of the head and handle portions of the four vibrators.

8. The self-rotation cleaning device according to claim 1, wherein three slide rails are arranged on the top and left and right sides of the outer housing, and the outer housing is further provided with a liquid injection port.

9. The self-rotation cleaning device according to claim 1, wherein the fluid perfusion system comprises a pump, a governor and a reservoir tank; the pump is connected to the governor by a wire, the pump is fixed to the bottom of the outer housing, and an outlet of the pump is connected to a liquid inlet at the front end of the inner cavity by a pipe; the top of the reservoir tank is provided with a liquid injection port, a filter screen is arranged in the middle of the reservoir tank, the tank wall above the filter screen is provided with an inlet, and the tank wall below the filter screen is provided with an outlet; the inlet of the reservoir tank is connected to a liquid outlet at the rear end of the inner housing by a pipe, the outlet of the reservoir tank is connected to an inlet of the pump by a pipe, and the liquid injection port of the reservoir tank is connected to the liquid injection port of the outer housing by a pipe.

10. A device for cleaning a photo-cured tissue engineering scaffold, comprising the self-rotation cleaning device according to claim 1.

11. A device for cleaning a photo-cured tissue engineering scaffold, comprising the self-rotation cleaning device according to claim 2.

12. A device for cleaning a photo-cured tissue engineering scaffold, comprising the self-rotation cleaning device according to claim 3.

13. A device for cleaning a photo-cured tissue engineering scaffold, comprising the self-rotation cleaning device according to claim 4.

14. A device for cleaning a photo-cured tissue engineering scaffold, comprising the self-rotation cleaning device according to claim 5.

15. A device for cleaning a photo-cured tissue engineering scaffold, comprising the self-rotation cleaning device according to claim 6.

16. A device for cleaning a photo-cured tissue engineering scaffold, comprising the self-rotation cleaning device according to claim 7.

17. A device for cleaning a photo-cured tissue engineering scaffold, comprising the self-rotation cleaning device according to claim 8.

18. A device for cleaning a photo-cured tissue engineering scaffold, comprising the self-rotation cleaning device according to claim 9.

\* \* \* \* \*